(12) United States Patent
Chen et al.

(10) Patent No.: US 10,222,860 B2
(45) Date of Patent: *Mar. 5, 2019

(54) ENHANCED VIRTUAL SCENARIOS FOR SAFETY CONCERNS

(71) Applicant: International Business Machines Corporation, Armonk, NY (US)

(72) Inventors: Jim C. Chen, Rochester, MN (US); Rafal P. Konik, Oronoco, MN (US); Ryan L. Rossiter, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/487,515

(22) Filed: Apr. 14, 2017

(65) Prior Publication Data

US 2018/0299955 A1  Oct. 18, 2018

(51) Int. Cl.
    *G06F 3/01* (2006.01)

(52) U.S. Cl.
    CPC .................. *G06F 3/015* (2013.01)

(58) Field of Classification Search
    None
    See application file for complete search history.

(56) References Cited

U.S. PATENT DOCUMENTS

| | | | | |
|---|---|---|---|---|
| 5,001,632 A * | 3/1991 | Hall-Tipping | ..... | A61B 5/02455 463/23 |
| 5,462,504 A * | 10/1995 | Trulaske | ..... | A61B 5/0002 482/54 |
| 5,577,981 A * | 11/1996 | Jarvik | ..... | A63B 21/154 434/247 |
| 6,572,511 B1 * | 6/2003 | Volpe | ..... | A63B 71/0622 482/4 |
| 6,817,979 B2 * | 11/2004 | Nihtila | ..... | A61B 5/0002 128/897 |
| 7,892,178 B1 * | 2/2011 | Bady | ..... | A61B 5/0205 463/36 |
| 8,503,086 B2 * | 8/2013 | French | ..... | A63B 24/0003 359/629 |

(Continued)

OTHER PUBLICATIONS

"Accelerated Examination Support Document," International Business Machines Corporation, dated Sep. 12, 2017, 42 pages.

(Continued)

*Primary Examiner* — Dorothy Harris
(74) *Attorney, Agent, or Firm* — Peter J. Edwards

(57) ABSTRACT

In various embodiments, a computer-implemented method includes collecting, using biometric sensors, stress data associated with a user of a virtual reality device. The method may also include determining a stress level of the user based on the stress data. The method may also include retrieving historical data of the user. The method may also include monitoring a current environment of the user during a current virtual session. The method may also include identifying a safety hazard during the current virtual session based on the stress data and the current environment. The method may also include determining, using the historical data, virtual scenarios that affect the stress level of the user. The method may also include generating, using the determined virtual scenarios, a safe virtual scenario to eliminate the safety hazard.

20 Claims, 6 Drawing Sheets

(56) References Cited

U.S. PATENT DOCUMENTS

| | | |
|---|---|---|
| 8,714,983 B2 | 5/2014 | Kil |
| 9,873,039 B2* | 1/2018 | Kim .................. A63F 13/00 |
| 2009/0270170 A1* | 10/2009 | Patton .................. A63F 13/10 463/36 |
| 2012/0136274 A1* | 5/2012 | Burdea .............. A61B 5/04842 600/545 |
| 2014/0149177 A1 | 5/2014 | Frank et al. |
| 2015/0029180 A1* | 1/2015 | Komatsu ............... G06T 19/006 345/419 |
| 2015/0262429 A1* | 9/2015 | Shuster ................ A61B 5/1123 345/633 |
| 2016/0027215 A1 | 1/2016 | Burns et al. |
| 2016/0042566 A1* | 2/2016 | Mao ..................... G06T 19/006 463/32 |
| 2016/0225188 A1 | 8/2016 | Ruddell et al. |
| 2016/0232717 A1 | 8/2016 | Wong et al. |
| 2016/0253842 A1 | 9/2016 | Shapira et al. |
| 2016/0279522 A1* | 9/2016 | de Plater ................ A63F 13/67 |
| 2017/0021279 A1* | 1/2017 | Kim .................. A63F 13/00 |
| 2017/0095732 A1* | 4/2017 | Ghaffari ................ A63F 13/211 |
| 2017/0148214 A1* | 5/2017 | Muniz-Simas ....... G06T 19/006 |
| 2017/0162072 A1* | 6/2017 | Horseman .............. G09B 19/00 |
| 2017/0229154 A1* | 8/2017 | Bose ..................... G11B 27/34 |

OTHER PUBLICATIONS

Chen et al., "Enhanced Virtual Scenarios for Safety Concerns," U.S. Appl. No. 15/705,502, filed Sep. 15, 2017.

List of Patents or Patent Applications Treated as Related, Signed Sep. 14, 2017, 2 pages.

James, "This VR Experiment Generates Beautiful Worlds From Your Biometrics," Road to VR, Aug. 18, 2016, 3 pages, http://www.roadtovr.com/this-vr-experiment-generates-beautiful-worlds-from-your-biometrics/.

Metz, "How to Avoid Real Objects While in a Virtual World," Intelligent Machines, Jun. 12, 2015, 7 pages, https://www.technologyreview.com/s/538336/how-to-avoid-real-objects-while-in-a-virtual-world/.

* cited by examiner

Table Log 2/3/17

Table Log {
User1: Game 1: Date: 2/3/2017

| Time: 00:00 - 00:51 | Enemy Units:0 | Setting: Empty Street | CPU Activity: None |
|---|---|---|---|
| | User Activity: Low | | User Stress: Low |
| Time: 00:52 - 02:50 | Enemy Units:1 | Setting: Building 1 | CPU Activity: Low |
| | User Activity: Idle/Hiding | | User Stress: Low |
| Time: 02:50 - 04:50 | Enemy Units:5 | Setting: Building 1 | CPU Activity: Attacking User |
| | User Activity: Idle Firing Arrow | | User Stress: Moderate |
| Time: 04:50 - 06:10 | Enemy Units:19 | Setting: DirtRoad | CPU Activity: Attacking User |
| | User Activity: Retreating, Running | | User Stress: High |
| Time: 06:10 - 08:00 | Enemy Units:3 | Setting: DirtRoad | CPU Activity: Dragon approaching user |
| | User Activity: Retreating, Running | | User Stress: Very High |
| Time: 08:02 | <GAME PAUSED BY USER> | | User Stress: Very High |

ENHANCED VIRTUAL SCENARIOS FOR SAFETY CONCERNS

BACKGROUND

The present disclosure relates to virtual reality, and more specifically to protecting users from safety hazards while using a virtual reality device.

SUMMARY

The present invention provides a computer-implemented method, system, and computer program product to generate safe virtual scenarios. The method may include collecting, using biometric sensors, stress data associated with a user of a virtual reality device. The method may also include determining a stress level of the user based on the stress data, where the stress level is a level of strain of the user. The method may also include retrieving historical data of the user, where the historical data includes surrounding activity and user stress levels associated with the surrounding activity within a surrounding environment during a first time period, where the surrounding environment includes a geographic area containing both the user of the virtual reality device and real objects. The method may also include monitoring a current environment of the user during a current virtual session, where the current environment is the surrounding environment during a second time period, where the second time period is subsequent to the first time period. The method may also include identifying a safety hazard during the current virtual session based on the stress data and the current environment. The method may also include determining, using the historical data, virtual scenarios that affect the stress level of the user. The method may also include generating, using the determined virtual scenarios, a safe virtual scenario to eliminate the safety hazard.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a sample table log of historical data, according to various embodiments.

Figure 1:
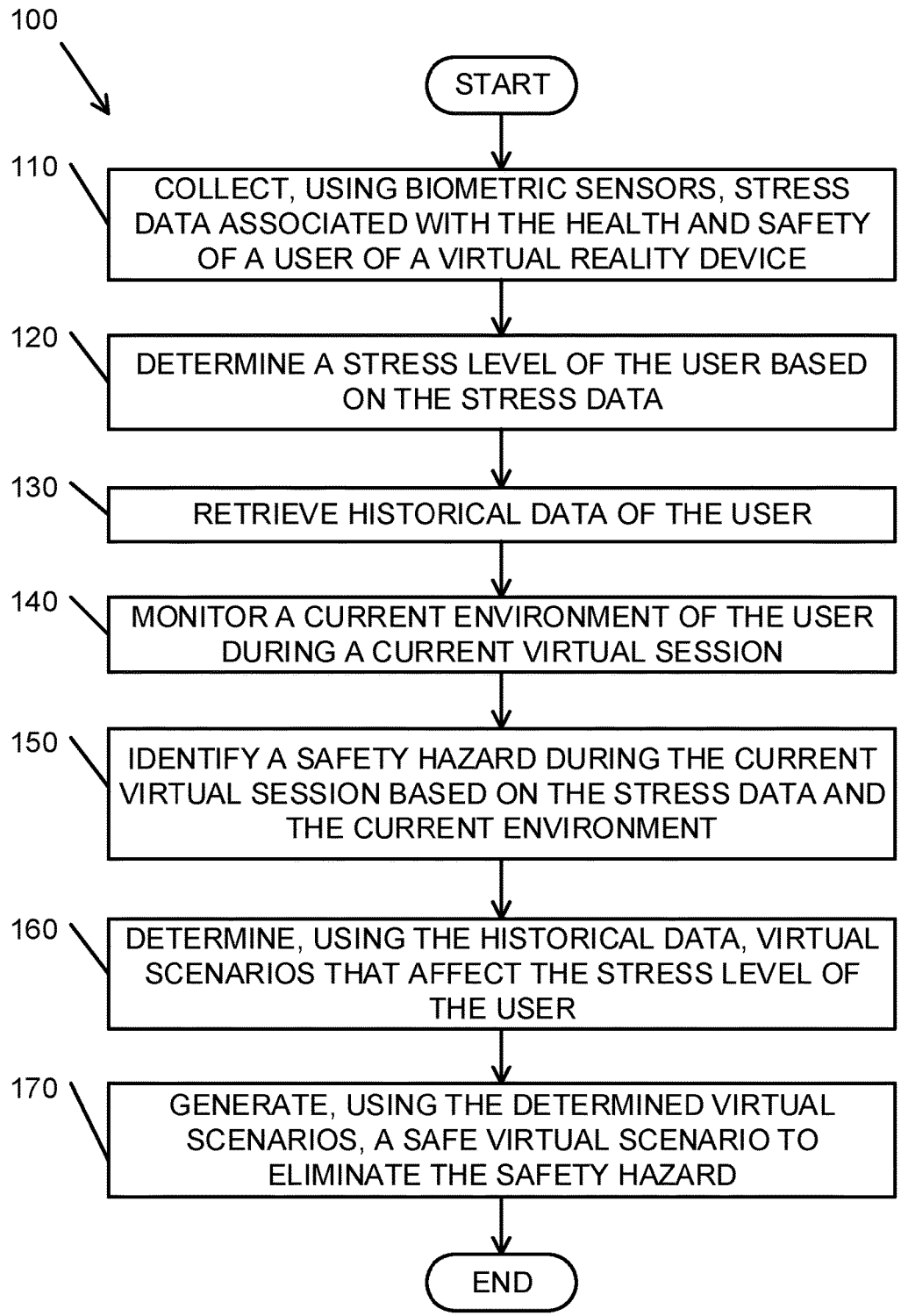
FIG. 1 presents a flowchart for generating safe virtual scenarios, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to virtual reality, and more specifically to protecting users from safety hazards while using a virtual reality device. While the present disclosure is not necessarily limited to such applications, various aspects of the disclosure may be appreciated through a discussion of various examples using this context.

The present invention provides a computer-implemented method, system, and computer program product to generate virtual scenarios for the safety of users of a virtual reality device. Currently, the first generation of fully immersing virtual reality games and products are hitting the mainstream marketplace. As the technology becomes more widely consumable, the abilities of the technology may advance. As the virtual reality technology advances, the capabilities of these virtual reality games and simulations may increase along with the intensity of the games and simulations. With the increasing technologies and intensities of virtual reality devices, user safety may become an increased concern.

Aspects of the present disclosure are directed toward using biometrics and an environment surrounding a user of a virtual reality device to detect potentially dangerous situations, and then modifying a virtual reality simulation generated by the virtual reality device for the safety of a user. Additionally, biometric data and data regarding the surrounding environment may be logged and archived for historical comparison. The archived data may be referred to herein as historical data. The virtual reality device and virtual reality simulation may also include an augmented reality device and an augmented reality simulation, respectively. Augmented reality may include a technology that integrates computer-generated images and simulations into the surrounding environment, or real-world surroundings, of a user. An augmented reality device may include any device or technology that is capable of executing an augmented reality. For example, an augmented reality device may be a pair of augmented reality glasses. An augmented reality simulation may be a simulation generated by an augmented reality device. The virtual reality device, or a computer system connected to the virtual reality device, may be configured to analyze the surrounding environment including physical objects in the real-world surroundings of a user. The virtual reality device or the computer system may also track user movement. For each virtual reality game or simulation, the virtual reality device or computer system may generate templates or scenarios of safe activities based on the historical data. These templates or scenarios may be configured using user behavior preferences determined for the virtual reality game and/or historical usage of the virtual reality game.

Potentially dangerous situations, or safety hazards, while a user is using a virtual reality device may include situations where a user is struggling physically or is approaching a physical obstacle in an area surrounding the user. Examples of a physically struggling user may be a user with an abnormally high heart rate, an abnormally high body temperature, an abnormally low body temperature, a high stress level, or other aberrations in biometric data that may indicate deleterious changes in the health and safety of the user. This data will be further discussed herein. Examples of a user approaching a physical obstacle may include a user getting close to a piece of furniture, a wall, another person (or any living thing), the virtual reality device, or any other obstacle that a user might encounter.

A user may be physically struggling while using a virtual reality device if the user is breathing heavily (e.g., the number of breaths taken by a user within a unit of time is above a threshold number of breaths) and the heart rate is high (e.g., the number of heart beats of a user within a unit of time is above a threshold number of heart beats). The virtual reality device or computer system may detect the heavy breathing or high heart rate and generate a safe scenario or activity to decrease the intensity of the game and lead to a more regular heart rate of the user (e.g., the number of heart beats of a user within a unit of time is within a threshold number of heart beats). For example, in a shooting type game, if a user is physically struggling, a safe scenario may reduce the skill, or the number, of the enemies in the game. This same scenario may allow the user to rest. As another example, in the shooting type game, if the user is physically struggling, the safe scenario may introduce a hiding spot, a fox hole for example, for the user to hide in and rest.

A user may be approaching a physical obstacle when the user is moving towards a real, or physical, object (e.g., a wall or a table). In this example, the virtual reality device or computer system may detect the user approaching the wall or table and generate a safe scenario to cause the user to change direction away from the potential hazard. For example, in a shooting type game, when a user is about to collide with a table in the real world, the safe scenario may include generating a tank, in the virtual world, that drives in the path of the user to make the user change directions and avoid the table.

Potentially dangerous situations, or safety hazards, may also include any other hazards that may affect the user's health, safety, and overall wellbeing. By generating safe virtual reality scenarios the user may avoid the potential hazards.

Referring now to FIG. 1, a flowchart illustrating a method 100 for generating safe virtual scenarios is depicted, according to various embodiments. In an embodiment, the method 100 is implemented as a computer script or computer program (e.g., computer executable code) to be executed on a computer system such as computer system 600, depicted in FIG. 6.

In various embodiments, a computer system may be configured to execute operation 110 to collect stress data associated with the health and safety of a user of a virtual reality device. Stress data may include at least one of brainwaves, heart rate, respiratory rate, stress levels, body temperature, blood pressure, and any other data relating to the health and safety of a user. In various embodiments, the stress data is collected using biometric sensors. For example, brainwaves may be measured using an electroencephalogram (EEG) and stress levels may be measured using galvanic skin response (GSR) or electro dermal activity (EDA).

Biometric sensors may refer to any sensors that measure metrics of biological data. Metrics of biological data may be a standard, or system, of measurement in regards to biological data, where biological data is any data relating to living things, more specifically persons (e.g., a user). Biological data may include stress data. For example, metrics of biological data may include beats per unit of time (e.g., beats per minute) to measure heart rate, breaths per unit of time (e.g., breaths per minute) to measure respiratory rate, a degree of heat to measure body temperature (e.g., Celsius, Fahrenheit, Kelvin, Rankine), and an amount of pressure to measure blood pressure (e.g., mmHg).

In various embodiments, biometric sensors may be placed within a virtual reality device or within wearable virtual reality hardware. The wearable virtual reality hardware may take virtual or computer generated imagery and present it into the entire field view of the user. Virtual imagery may include images generated by a computer, sometimes generated to replicate something from the real world, where the real world is the physically existing world. In augmented reality scenarios, wearable virtual reality hardware may take the computer generated imagery and render it within the field of view of the user such that the user perceives the virtual imagery as part of the real world. In various embodiments, wearable virtual reality hardware may include a Head Mounted Display (HMD) or visual apparatus. In various embodiments, stress data may be collected using conductive bands or mounted pillow sensors attached to virtual reality hardware. The stress data may be transmitted to a computer system from the biometric sensors.

In various embodiments, resting parameters of stress data (herein resting data) may be determined for each user. Resting data may include stress data of a user when the user is not involved in activity. For example, a resting heart rate may be recorded as resting data of a user. In an embodiment, the first time a user uses a virtual reality device, before the user participates in any activity, stress data such as heart rate and body temperature may be recorded as resting data. In various embodiments, the resting data may be used as a baseline for the stress data.

In various embodiments, the computer system may be configured to execute operation 120 to determine a stress level of the user based on the stress data. The stress level may be a level of strain of the user. In various embodiments, strain may include the physical, emotional, and mental efforts, struggles or tensions of a user. The stress data may be used to determine the amount of strain. In various embodiments, the stress level is determined from previously collected and stored stress data (herein historical data). Historical data is further discussed herein. In various embodiments, there are different stress level metrics for defining or measuring varying degrees of stress. For example, stress levels may include no stress, moderate stress, and high stress. In various embodiments, a stress level is any representation of the amount of stress of the user. In various embodiments, a stress level may be a number that corresponds to an amount of stress of the user. For example, stress levels may range from 1 to 10, with 1 being no stress and 10 being maximum stress, or vice versa. A stress level may also be a percentage that corresponds to an amount of stress of the user.

In various embodiments, the computer system may determine a threshold stress level for the user. This threshold stress level may be specific to each user or may be a generic level. The threshold stress level may be a stress level that once above, or below, the threshold, the stress level of the user may be unsafe or potentially unsafe. In various embodiments, the threshold stress level of the stress data may be determined using the biometric sensors. In various embodiments, stress data may be continuously measured and recorded. The corresponding stress levels may also be continuously measured and recorded. The threshold stress level may be determined using the continuously measured stress data. In various embodiments, the threshold stress level may be a preset level. The preset level may be a level set by the computer system. In various embodiments, the preset level may not be formulated to the user. For example, the preset level may be a medium stress level regardless of the stress data of a user. In various embodiments, the preset level is formulated to the user based on general data of the user (e.g., age, height, weight, gender). The user may input the general data before using a virtual reality device. For example, general data may indicate that a user is male, 18 years old, 70 inches tall, and 180 pounds. The computer system may determine from the general data that the preset level of the user is a high stress level because the user is young and in good health, based on the general data. In another example, general data may indicate that a user is female, 75 years old, 60 inches tall, and 110 pounds. The computer system may determine from the general data that the preset level of the user is a low stress level based on the age of the user and the general data.

A resting stress level may be determined using the resting data. In various embodiments, the resting stress level may be used to determine the threshold stress level. The computer system may compare the resting data and the stress data, and then use a result of the comparison to determine the threshold stress level. For example, the resting data may include a heart rate of 95 beats per minute (bpm) and the resting stress level may indicate low stress. Both the resting heart rate and the resting stress level may indicate that the user is in poor physical condition, because the user is experiencing some stress as well as a moderately elevated heart rate while resting. By comparing the resting data and the stress data, resulting in the indication that the user is in poor physical condition, the threshold stress level may be a moderate threshold stress level (e.g., a medium stress level) to ensure that the user stays safe.

In various embodiments, the resting data and threshold stress levels for the user may be stored in a custom user profile specific to the user. The custom user profile is further discussed in FIG. 4 herein.

In various embodiments, the computer system may be configured to execute operation 130 to retrieve historical data of the user. In various embodiments, historical data includes surrounding activity and user stress levels associated with the surrounding activity within a surrounding environment during a first time period.

Surrounding activity may include any activity of, or surrounding, the user. The activity of the user may include any activity that is being executed by, or done by, the user. The activity surrounding the user may include activities of real objects around, or in the geographic area of, the user. A geographic area surrounding a user may be referred to as a surrounding environment, discussed herein. Real objects are further discussed herein. Surrounding activity may also include activity occurring within a virtual reality game or simulation. User stress levels associated with the surrounding activity may include stress levels corresponding with specific surrounding activities. For example, a user may have had a high stress level when being chased by a monster within a virtual reality game. These surrounding activities may then be associated with user stress levels.

In various embodiments, a first time period may include any time period preceding the current time period. The current time period may be a present time of a user, where the user is using a virtual reality device. In various embodiments, operations 110 and 120 are being executed during the current time period. Operation 130 may be executed during the first time period.

In various embodiments, the surrounding environment includes a geographic area wherein the user of the virtual reality device is located. The surrounding environment may be the real-world surroundings of the user. For example, the surrounding environment may be a room, defined by walls, in which the user is located. In another example, the surrounding environment may be a measured distance or area (e.g., 400 square feet) surrounding a user. The surrounding environment may also include real objects within the geographic area. Examples of real objects may include furniture, electronics, walls, doors, shoes, or any other physical objects. Physical objects may include living objects such as humans, animals, plants, and any objects that are living things.

In various embodiments, the historical data of the user may be stored in a custom user profile specific to the user. The custom user profile is further discussed in FIG. 4 herein. Historical data and retrieving historical data are further discussed herein in FIG. 2.

In various embodiments, the computer system may be configured to execute operation 140 to monitor a current environment of the user during a current virtual session, where the current virtual session is a virtual simulation occurring at the current time period. The current environment may include the surrounding environment during a second time period. In various embodiments, the second time period is the current time period or the current time. The second time period may be subsequent to the first time period. Monitoring the current environment may include scanning the geographic area for real and physical objects. In various embodiments, monitoring the current environment includes using sensors to track the user and detect real objects within the surrounding environment. The sensors may be located on the virtual reality device or wearable virtual reality hardware. In various embodiments, the sensors may be located in the computer system. The sensors may be wearable sensors separate from the virtual reality device.

In various embodiments, tracking the user may include identifying a specific location of the user. Sensing the real objects may include identifying a specific location or specific locations of the objects. Monitoring the current environment may also include determining the relative distances between the location of the user and the locations of real and physical objects in the surrounding environment. Relative distances may include a measured distance between the location of the user and the locations of real and physical objects. For example, monitoring the current environment may include determining that the user is 2 feet away from a chair. Relative distances may include a label indicating a generic distance (e.g., near, close, approaching, beside, adjacent, neighboring, bordering, far, long, distant, removed, outlying) between the location of the user and the locations of real and physical objects.

In various embodiments, the computer system may be configured to execute operation 150 to identify a safety hazard during the current virtual session based on stress data and the current environment. A safety hazard may be any source of potential harm to a user. In various embodiments, identifying a safety hazard includes determining that the stress data is outside of a safe range therefore the user is experiencing stress or strain. This may include a body temperature that is abnormally high or low, a heart rate that is abnormally high or low, a breathing rate that is abnormally high or low, brainwaves that are abnormally high or low, or any other biometric data that may be unusual or abnormal for a user. For example, a safety hazard may be a body temperature of 105° F. This body temperature is abnormal for a person and can harm the user's health and wellness, thus it is a safety hazard.

In various embodiments, identifying a safety hazard includes determining, from the monitoring, that the user is in close proximity to one or more real objects. For example, a user may be 3 feet from a couch while facing the direction of the couch. In this example, the user is close to potentially running into the couch which could harm the user, thus there is a safety hazard. In another example, a dog may enter the room of the user and start moving toward the user. In this example, the dog and the user could potentially collide. A collision with the dog could harm the user, thus there is a safety hazard.

In various embodiments, the computer system may be configured to execute operation 160 to determine, using the historical data, virtual scenarios that affect the stress level or safety of the user. In various embodiments, virtual scenarios are actions, objects, or situations within a virtual reality simulation. In various embodiments, virtual scenarios may be a virtual reality simulation. For example, a virtual scenario may be a car moving in a virtual environment or simulation. In another example, a virtual scenario may be a person or entity rendered in a virtual reality environment or simulation. An entity may be any being rendered in a virtual reality environment or simulation. In another example, a virtual scenario may be a medieval themed virtual simulation. A virtual reality simulation may include any type of simulation rendered or generated using a virtual reality device. In various embodiments, virtual reality simulations include virtual reality games (e.g., video games).

To determine virtual scenarios that affect the stress level or safety of the user, the computer system may compare different virtual scenarios and their corresponding stress levels and stress data within the historical data. For example, a virtual scenario may be an enemy character (or entity) who is added to a virtual reality game. The addition of the enemy character may increase the heart rate and breathing rate of the user, thus increasing the stress level of the user. In this example, the historical data may include an indication that the addition of the enemy character increased the stress level of the user. Both the virtual scenarios and stress level data may be stored with the historical data.

In various embodiments, the computer system may be configured to execute operation 170 to generate, using the determined virtual scenarios, a safe virtual scenario to eliminate a safety hazard. The safe virtual scenario may also prevent the safety hazard. In various embodiments, the safe virtual scenario may be determined based on the virtual scenarios. The safe virtual scenario may be generated in response to identifying the safety hazard. The computer system may monitor user stress data for elevated stress levels or physical struggles. If the user has an elevated stress level, which identifies or indicates a safety hazard, then the computer system may alter the virtual reality presentation by introducing, or generating, the safe virtual scenario.

In various embodiments, generating the safe virtual scenario includes altering a virtual reality presentation of the current virtual session by introducing a low stress virtual scenario. The low stress virtual scenario may be introduced in situations when the user's stress level is elevated. For example, when a user has an extremely high breathing rate and body temperature, the stress level may elevate. To eliminate the safety hazard, a low stress virtual scenario is introduced. In this example, the low stress virtual scenario may be less strenuous for the user and the breathing rate and body temperature may decrease.

In various embodiments, it may be identified that the safety hazard includes determining that the stress data of the user indicates that the stress level of the user is greater than a threshold stress level, and the safe virtual scenario reduces the stress level of the user below the threshold stress level. By reducing the stress level of the user, for example by introducing a low stress virtual scenario, the user's stress data may return to normal readings, therefore eliminating the safety hazard.

In various embodiments, generating the safe virtual scenario includes altering a virtual reality presentation of the current virtual session by introducing a high stress virtual scenario. The high stress virtual scenario may be introduced in situations when it is necessary to shock or scare the user, or to change their direction of movement. For example, when a user is in close proximity to a chair, a high stress virtual scenario, such as the enemy character, may be introduced. In this example, the introduction of the enemy character may cause the user to change direction, thus avoiding the chair.

In various embodiments, the computer system may determine that a safety hazard included real objects within the geographic area were in a path of the user and that the safe virtual scenario changed the path of the user. By changing the path of the user, for example, by introducing a high stress virtual scenario, the computer system may have prevented the user from being hurt by a collision with the real objects, therefore eliminating the safety hazard. By changing the path of the user, the safety hazard is eliminated.

In various embodiments, generating a safe virtual scenario to eliminate safety hazards includes identifying a past, or historical, virtual scenario and the corresponding environment that best matches, or is most similar to, the current environment. For example, if a past virtual scenario introduced a car to prevent the user from colliding with real objects (for example a table) in a previous virtual session, then the generated safe virtual scenario may also introduce a car if the user may potentially to collide with real objects while in a current virtual session. Identifying the historical virtual scenario and the corresponding environment that best matches, or is most similar to, the current environment may include correlating or comparing the current environment with the corresponding historical environment and virtual scenario.

In various embodiments, an internal table, within a memory or storage the computer system, may be used to generate the safe virtual scenario based on the closest matches to known historical virtual scenarios.

For example, a table of a current virtual session at the current time may store data indicating the following:

| | | |
|---|---|---|
| Enemy Units: 5 | Setting: Building 1 | CPU Activity: Attacking |
| User Activity: Idle Firing Arrow | | User Stress: Moderate |
| Possible reactions: {Scenario 1, Scenario 2, Scenario 3, etc.} | | |

The table indicates that there are 5 enemy characters, the virtual setting is in Building 1, the virtual simulation is attacking the user, the user is firing arrows, and the user has a moderate stress level.

In this example, Scenario 1 may be similar to a previously logged historical virtual scenario, that may read:

| | | |
|---|---|---|
| Enemy Units: 1 | Setting: Building 1 | CPU Activity: Low |
| User Activity: Idle/Hiding | | User Stress: Low |

According to the table for the previously logged scenario, there was 1 enemy character, the virtual setting is in Building 1, the virtual simulation activity is low, the user is hiding, and there is a low stress level. The stress level for the previously logged scenario is lower than the stress level of the current scenario. The previously logged scenario also has less enemy units and the user is hiding instead of attacking. In this example, in order to decrease the user stress level for the current scenario, the computer system may decrease the amount of enemy units and/or introduce something for the user to hide in that best matches the historical virtual scenario.

In various embodiments, method 100 may further include generating a content template for a simulation on a virtual reality device. In various embodiments, the content template includes mapping an interactive entity within the virtual reality simulation to the stress level of the user. The content template may be a template of objects (or entities) within a virtual reality simulation, herein virtual objects, and environments for the virtual reality simulation. In various embodiments, an interactive entity is an object within the virtual reality simulation. For example, an interactive entity may be a horse within the simulation. Mapping an interactive entity within the simulation to the stress level of the user may include correlating, or connecting, stress levels to the interactive entities. For example, every time the horse is introduced in the simulation, the user stress level may decrease, therefore the horse would correlate with, or be mapped to, a low stress level.

For each game or simulation there may be relevant content unique and mappable to that specific simulation. For example, a Medieval Fantasy game may have knights, wizards, dragons, townsfolk, swords, arrows, castles, and anything else that may be part of a medieval world. These different objects are the relevant content that makes up the content template. In various embodiments, the relevant content is managed by software.

In various embodiments, generating the content template includes identifying virtual objects within the simulation. The virtual objects are objects within the virtual simulation. Identifying virtual objects may include locating all the objects within the virtual simulation. Virtual objects may be the same as the interactive entities discussed herein.

Generating the content template may further include mapping the identified virtual objects to a first data structure, the first data structure associating each of the identified virtual objects with an identifier and a set of one or more attributes. In various embodiments, mapping the identified objects to a first data structure includes correlating, or mapping an identity document (ID) to each virtual object. Each ID may correlate with specific attributes, where attributes are specific traits or characteristics that are specific to the ID.

For example, in a Medieval Fantasy game, each object is mapped to an ID.
  enum objects {
    Knight=knightIDValue,
    DarkKnight=darkknightIDValue,
    Dragon=dragonIDValue,
    Wizard=wizardIDValue,
    . . .
    Sword=swordIDValue,
    Shield=shieldIDValue,
    Arrow=arrowIDValue,
    . . .
    Castle=castleIDValue,
    Shed=shedIDValue,
    Catapult=catapultIDValue
  }

Generating the content template may further include identifying activities within the simulation. In various embodiments, identifying activities includes correlating, or mapping, an ID to each activity within the simulation.

For example, in the Medieval Fantasy game, activities are mapped to an ID.
  enum actions {
    Idle=idleIDValue
    Walking=walkingIDValue
    Running=runningIDValue
    Stalking=stalkingIDValue
    Hiding=hidingIDValue
    Attacking=attackingIDValue
    Retreating=retreatIDValue
    . . .
    . . .
  }

Generating the content template may further include mapping the identified activities to a second data structure, the second data structure associating each of the identified activities with a stress level of the user. The virtual objects, their corresponding ID, and their attributes may be mapped to, or correlated with, stress level tiers associated with each of the activities.

For example, continuing the Medieval Fantasy theme, the objects, attributes are mapped to the activities. The activities are further mapped to stress levels.
  Dark Knight
  ID: darkknightIDValue
  Entity Attributes: adversary to user
  Weaponry: sword, shield, lance, horse
  Low Stress Level Activities: walking, standing, sitting, no weapon
  High Stress Level Activities: armed, fighting, running towards user, attacking
  Dragon
  ID: dragonIDValue
  Entity Attributes: adversary to user
  Weaponry: fire, claws, teeth
  Low Stress Level Activities: idle, sleeping, facing away from user
  High Stress Level Activities: chasing user, breathing fire, approaching user, flying In various embodiments, as the user further interacts in the virtual reality simulation, the computer system may map other scenarios to various stress levels. For example, the user may run into a building to hide. In this example, the system can detect that enemy characters cannot see the user, the user activity is low, and the user stress data is below the threshold. This data would then be added to the content template.

Generating the content template may further include integrating the first data structure and the second data structure into a third data structure to generate the content template. In various embodiments, the content template may include both the first data structure and the second data structure, further integrated, or mapped into a third, complete, data structure. The third data structure may include the virtual objects, the corresponding IDs, the attributes, the activities, and the corresponding stress levels.

In various embodiments, method 100 may further include creating a custom user profile for the user of the virtual reality device. Creating the custom user profile is further discussed in FIG. 4 herein.

Figure 2:
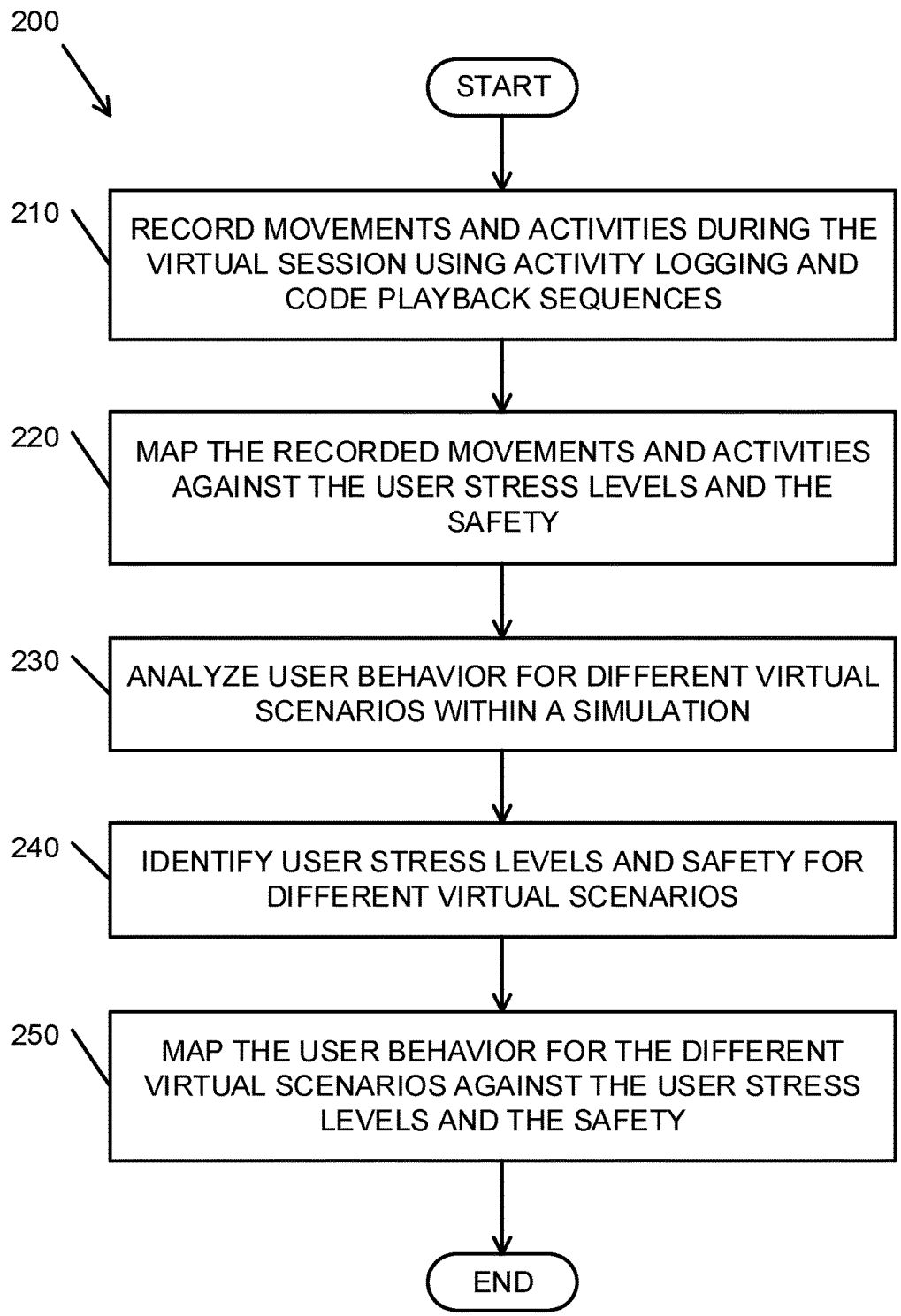
FIG. 2 presents a flowchart for retrieving historical data, according to various embodiments.

Referring to FIG. 2, a flowchart illustrating method 200 for retrieving historical data is depicted, according to various embodiments. In an embodiment, the method 200 is implemented as a computer script or computer program to be executed on a computer system such as computer system 600, depicted in FIG. 6. Historical data may be stress data that is collected and potentially analyzed at a time that precedes the current time, herein a first time period.

In various embodiments, a computer system may be configured to execute operation 210 to record movements and activities during a virtual session using activity logging and code playback sequences. The virtual session may be a period of time that a user played or participated in the virtual reality simulation or game. Recording movements and activities during the virtual session may include collecting the stress data, determining a stress level, and monitoring the environment. Recording movements and activities may further include identifying a safety hazard during the virtual session and generating a safe virtual scenario to eliminate the safety hazard during the first time period. This data may be recorded and stored using the activity logging and code playback sequences. This may include visually playing back a sequence like an instant replay, while internally the system records the individual entity movements and activities.

In various embodiments, the computer system may be configured to execute operation 220 to map the recorded movements and activities against the user stress levels and the safety. Mapping the recorded movements and activities may include correlating the activities with different stress levels.

In various embodiments, the computer system may be configured to execute operation 230 to analyze user behavior for different virtual scenarios within a simulation. Analyzing user behavior may include identifying and examining different user actions throughout a virtual session. For example, a user may pause the game in the middle of a session. In this example, the user stress level may have been extremely high at the time of the pause. Later in the session, the user may retreat when the stress level is very high. The computer system may analyze these actions and attempt to identify patterns and recurring actions.

In various embodiments, the computer system may be configured to execute operation 240 to identify user stress levels and safety for different virtual scenarios. For example, when an enemy is introduced to the simulation, the user stress levels and safety are analyzed. In this example, the user's heart rate and body temperature may increase with the addition of the enemy character, which may increase the user stress level and decrease the user safety.

In various embodiments, the computer system may be configured to execute operation 250 to map the user behavior for the different virtual scenarios against the user stress levels and the safety. FIG. 5 shows an example of mapped historical data from a past virtual session. In various embodiments, the data may be contained as data structures within a database. By mapping and storing the historical data, the virtual scenarios and generated safe scenarios may be more effective for the user.

Figure 3:
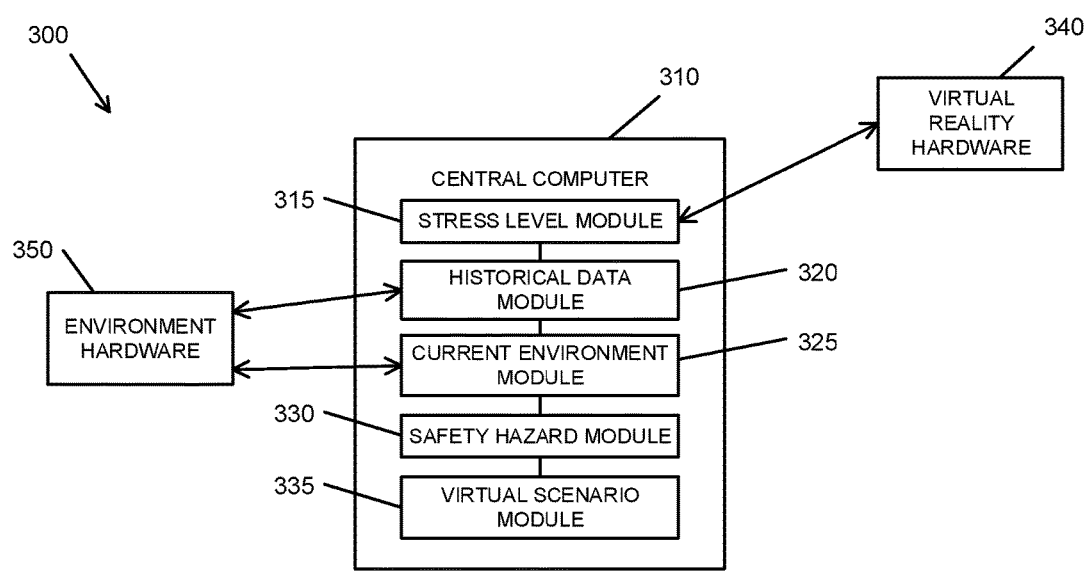
FIG. 3 depicts a schematic diagram outlining a computer system for generating safe virtual scenarios, according to various embodiments.

Referring to FIG. 3, a system 300 includes a computer system for generating safe virtual scenarios and protecting the safety of users of a virtual reality device, according to various embodiments. System 300 is only one possible computer system capable of generating safe virtual scenarios and protecting the safety of users, and is only illustrated for example purposes.

In various embodiments, system 300 includes a central computer 310, virtual reality hardware 340, and environment hardware 350. The virtual reality hardware 340 may include visual presentation hardware and/or a sensor apparatus. In various embodiments, the user wears the visual presentation hardware, typically covering the eyes, therefore the user can see the rendering and display. The visual presentation hardware is typically some type of Head Mounted Display (HMD) or visual apparatus. The sensor apparatus may be held in the hands or worn on the body of the user to convey motion. The sensor apparatus may also allow interaction with objects in the virtual environment. In various embodiments, the sensor apparatus may include sensors attached to the user to monitor the user's movements and surroundings. In various embodiments, the biometric sensors are included with the sensor apparatus or are attached to the visual presentation hardware. The biometric sensors may be attached or included with the virtual reality hardware 340. In various embodiments, the virtual reality hardware 340 is the virtual reality device discussed herein.

In various embodiments, the environment hardware 350 is comprised of sensors or other computing devices that allow for tracking the user and sensing the environment and objects within the surrounding environment. The environment hardware 350 may be a plurality of sensors spaced orthogonally to each other. The environment hardware 350 may provide a wide angle view to capture all elements within the surrounding environment. In various embodiments, the environment hardware 350 may be coupled to the virtual reality hardware 340.

The central computer 310 may include a stress level module 315, a historical data module 320, a current environment module 325, a safety hazard module 330, and a virtual scenario module 335. In various embodiments, the stress level module 315 collects, using biometric sensors, stress data associated with the health and safety of a user of a virtual reality device. The stress level module 315 may receive and collect the stress data from the virtual reality hardware 340. In various embodiments, the stress level module 315 determines a stress level of the user based on the stress data. The historical data module 320 may retrieve historical data of the user. In various embodiments, the historical data may be received or collected from the environment hardware 350 and then stored on the central computer 310. In various embodiments, the current environment modules 325 monitors a current environment of the user during a current virtual session. In various embodiments, the sensors from the environment hardware 350 are used to help monitor the current environment. The safety hazard module 330 may identify a safety hazard during the current virtual session based on the stress data and the current environment. In various embodiments, the virtual scenario module 335 determines, using the historical data, virtual scenarios that affect the stress level of the user. The virtual scenario module 335 may also generate, using the determined virtual scenarios, a safe virtual scenario to eliminate the safety hazard. In various embodiments, the central computer 310 is a part of the virtual reality hardware 340.

In various embodiments, central computer 310 further includes a content template module to generate a content template for a simulation on a virtual reality device. The content template module may be further configured to identify virtual objects within the simulation, map the identified virtual objects to a first data structure, identify activities within the simulation, map the identified activities to a second data structure, and integrate the first data structure and the second data structure into a third data structure to generate the content template.

In various embodiments, central computer 310 further includes a user profile module to create a custom user profile for the user of the virtual reality device. In various embodiments, the user profile module is further configured to gather user data, generate an activity profile, generate a stress threshold profile, and integrate the user data, the activity profile, and the stress threshold profile to create the custom user profile.

In various embodiments, the environment hardware 350 and the virtual reality hardware 340 are connected to the central computer 310. The environment hardware 350, the virtual reality hardware 340, and the central computer 310 may be communicatively coupled via computer cables, wireless internet, the Internet of Things (IoT), cloud computing, or any other technology used to connect various computing devices for facilitating data transmission and inter device communication.

In various embodiments, the central computer 310 is configured to execute the method shown in FIG. 1. The central computer 310 may be further configured to execute the method shown is FIG. 2.

Figure 4:
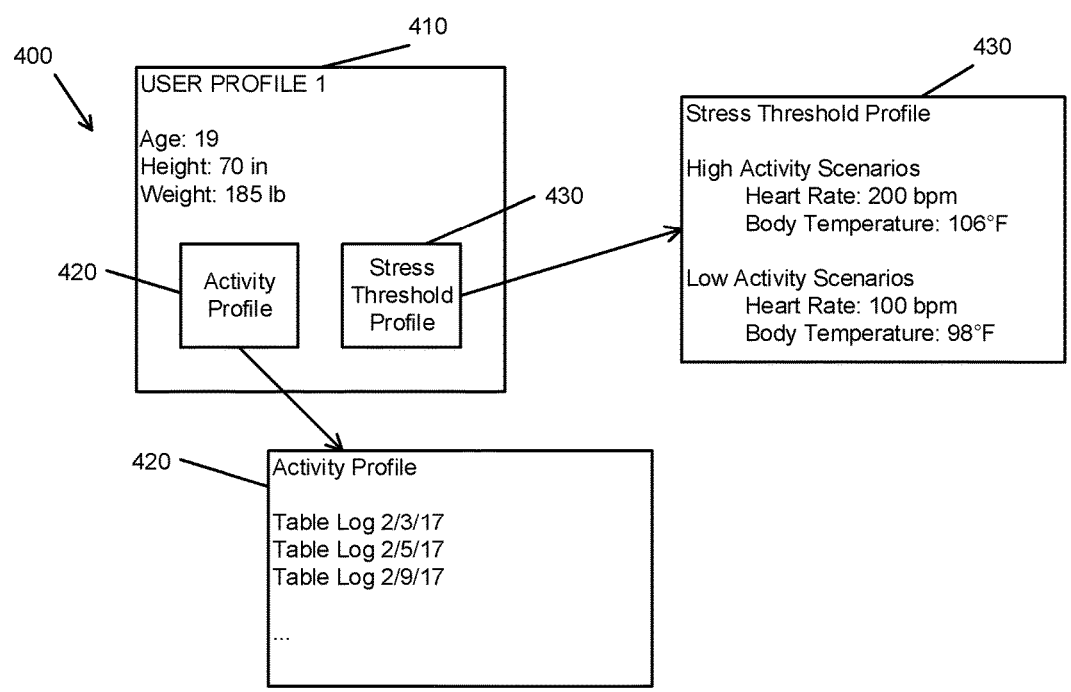
FIG. 4 depicts a block diagram of a user profile, according to various embodiments.

Referring to FIG. 4 a block diagram of a user profile 410 is depicted, according to various embodiments. A single user profile 410 is depicted, but the computer system, for example computer system 300 (depicted in FIG. 3) or computer system 600 (depicted in FIG. 6), may include any number of user profiles. In various embodiments, user profile 410 is a user profile for a first user of the virtual reality device. The user profile 410 may include general data for the user (e.g., age, height, and weight). The user profile 410 may also include an activity profile 420 and a stress threshold profile 430.

In various embodiments, creating a custom user profile includes gathering user data, generating an activity profile 420, generating a stress threshold profile 430, and integrating the user data, the activity profile 420, and the stress threshold profile 430 to create the custom user profile. The user data may include at least one of age, health statistics, and runtime activity statistics. Health statistics may be any statistics or data relating to the health and safety of the user. In various embodiments, health statistics may include stress data. Runtime activity statistics may be any data or statistics relating to the actions and activities of both the user and the virtual reality simulation while partaking in the simulation. In various embodiments, runtime activity statistics may include the quantity of enemy characters, the setting of the simulation, the virtual reality activity, the user activity, and the user stress. The virtual reality activity may include the activity of all the device controlled characters and objects. The user activity is the activity of the user of the virtual reality device.

In various embodiments, the activity profile 420 comprises the user data relating to the health and safety of the user for different virtual scenarios within the simulation. The activity profile 420 may include user actions and their corresponding stress levels. For example, a user may manually pause or quit a simulation or game. This may be logged in the activity profile 420 along with the user stress level at this time. Additionally, if the user restarts after resting, the amount of rest, the time of rest, body metrics before and after, may also be recorded and added to the activity profile 420. This data may be stored in various table logs. The table logs may be sorted by date.

In various embodiments, the stress threshold profile 430 comprises the stress data of the user for the different virtual scenarios within the simulation. The stress data may also be sorted into various stress levels. For example, the stress threshold profile 430 may include heart rate, sweat, and body temperature during high activity scenarios as well as heart rate, sweat, and body temperature during low activity scenarios. The stress threshold profile 430 may also include the user's body statistics for each scenario.

Referring to FIG. 5 a table log of historical data is depicted, according to various embodiments. As discussed herein, the activity profile 420 within a user profile 410 may include a table log. In various embodiments, this table log corresponds to the mapped historical data discussed herein. The table log may include general information such as the name of the user, the specific game or simulation being played, and the date. The table log may also include various gaming sessions throughout the day and specific information relating to each gaming session. The specific information may include the number of enemy units or characters, the setting, the virtual reality device activity, the user activity, and the user stress level. For example, depicted in FIG. 5, from time 00:00-00:51 there were 0 enemy characters, the user was on an empty street, the computer generated/controlled characters were not active, the user was not very active, and the user stress level was low.

FIG. 5 depicts just one example of how historical data and activity data can be stored. The claimed invention is not limited to this method of storing the data.

Figure 6:
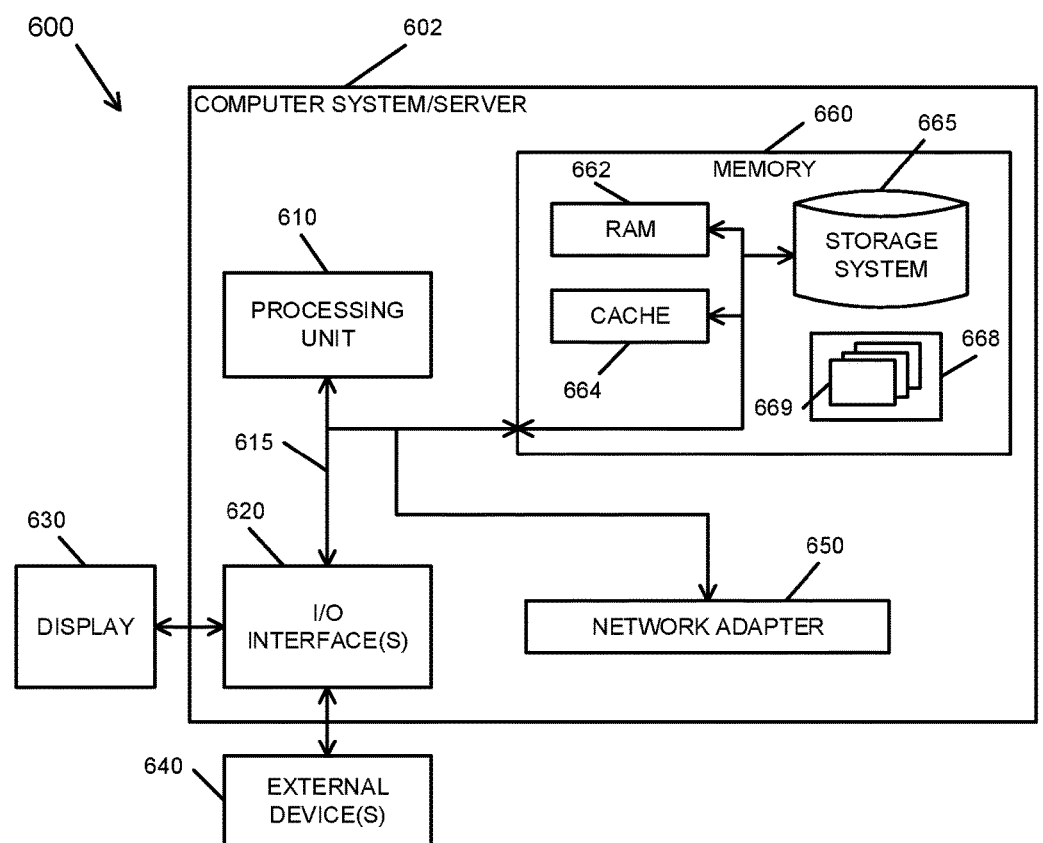
FIG. 6 depicts a sample computer system, according to various embodiments.

Referring to FIG. 6, computer system 600 is a computer system/server 602 is shown in the form of a general-purpose computing device, according to various embodiments. The components of computer system/server 602 may include, but are not limited to, one or more processors or processing units 610, a system memory 660, and a bus 615 that couple various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the invention.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    collecting, using biometric sensors, stress data associated with a user of a virtual reality device;
    determining a stress level of the user based on the stress data, wherein the stress level is a level of strain of the user;
    retrieving historical data of the user, wherein the historical data includes activities and scenarios within one or more historical virtual sessions of a simulation during a first time period and surrounding activity and historical user stress levels associated with the activities within the one or more historical virtual sessions, wherein the surrounding activity is within a surrounding environment during a first time period, wherein the surrounding environment comprises a geographic area containing both the user of the virtual reality device and real objects;
    monitoring a current environment of the user during a current virtual session, wherein the current environment is the surrounding environment during a second time period, wherein the second time period is subsequent to the first time period;
    identifying a safety hazard during the current virtual session based on the stress data and the current environment;
    determining, using the historical data, historical virtual scenarios that affect the historical user stress level or historical safety of the user; and
    generating, using the determined historical virtual scenarios, a safe virtual scenario to eliminate the safety hazard.

2. The method of claim 1, further comprising:
    generating a content template for the simulation, wherein the content template comprises mapping an interactive entity within the simulation to the stress level of the user.

3. The method of claim 2, wherein generating the content template comprises:
    identifying virtual objects within the simulation;
    mapping the identified virtual objects to a first data structure, the first data structure associating each of the identified virtual objects with an identification and a set of one or more attributes;
    identifying the activities within the simulation;
    mapping the identified activities to a second data structure, the second data structure associating each of identified activities with a stress level of the user; and
    integrating the first data structure and the second data structure into a third data structure to generate the content template.

4. The method of claim 1, wherein retrieving the historical data comprises:
    recording movements and the activities during the historical virtual session using activity logging and code playback sequences;
    mapping the recorded movements and activities against the historical user stress levels and the historical safety;
    analyzing user behavior for different historical virtual scenarios within the simulation;
    identifying the historical user stress levels and the historical safety for the different historical virtual scenarios; and
    mapping the user behavior for the different historical virtual scenarios against the historical user stress levels and the historical safety.

5. The method of claim 1, wherein monitoring the current environment comprises using sensors to track the user and sense the real objects within the surrounding environment.

6. The method of claim 1, wherein the stress data includes at least one of brainwaves, heart rate, respiratory rate, stress levels, body temperature, and blood pressure.

7. The method of claim 1, further comprising creating a custom user profile for the user of the virtual reality device.

8. The method of claim 7, wherein creating a custom user profile comprises:
    gathering user data, wherein user data comprises at least one of age, health statistics, and runtime activity statistics;
    generating an activity profile, wherein the activity profile comprises the user data relating to historical health and the historical safety of the user for different historical virtual scenarios within the simulation;
    generating a stress threshold profile, wherein the stress threshold profile comprises the stress data of the user for the different historical virtual scenarios within the simulation; and
    integrating the user data, the activity profile, and the stress threshold profile to create the custom user profile.

9. The method of claim 1, wherein generating the safe virtual scenario includes altering a virtual reality presentation of the current virtual session by introducing a low stress virtual scenario.

10. The method of claim 1, wherein generating the safe virtual scenario includes altering a virtual reality presentation of the current virtual session by introducing a high stress virtual scenario.

11. The method of claim 1, wherein,
identifying the safety hazard includes determining that the real objects within the geographic area are in a path of the user, and
the safe virtual scenario changes the path of the user.

12. The method of claim 1, wherein,
identifying the safety hazard includes determining that the stress data of the user indicates that the stress level of the user is greater than a threshold stress level, and
the safe virtual scenario reduces the stress level of the user below the threshold stress level.

13. A system comprising:
one or more computer processors comprising:
a stress level module to collect, using biometric sensors, stress data associated with the health and safety of a user of a virtual reality device, the stress level module to determine a stress level of the user based on the stress data, wherein the stress level is a level of strain of the user;
a historical data module to retrieve historical data of the user, wherein the historical data includes activities and scenarios within one or more historical virtual sessions of a simulation during a first time period and surrounding activity and historical user stress levels associated with the activities within the one or more historical virtual sessions, wherein the surrounding activity is within a surrounding environment during a first time period, wherein the surrounding environment comprises a geographic area containing both the user of the virtual reality device and real objects;
a current environment module to monitor a current environment of the user during a current virtual session, wherein the current environment is the surrounding environment during a second time period, wherein the second time period is subsequent to the first time period;
a safety hazard module to identify a safety hazard during the current virtual session based on the stress data and the current environment; and
a virtual scenario module to determine, using the historical data, historical virtual scenarios that affect the historical user stress level or historical safety of the user, the virtual scenario module to generate, using the determined historical virtual scenarios, a safe virtual scenario to eliminate the safety hazard.

14. The system of claim 13, further comprising:
a content template module to generate a content template for the simulation, wherein the content template comprises mapping an interactive entity within the simulation to the stress level of the user.

15. The system of claim 14, wherein, to generate the content template, the content template module is further configured to:
identify virtual objects within the simulation;
map the identified virtual objects to a first data structure, the first data structure associating each of the identified virtual objects with an identification and a set of one or more attributes;
identify the activities within the simulation;
map the identified activities to a second data structure, the second data structure associating each of identified activities with a stress level of the user; and
integrate the first data structure and the second data structure into a third data structure to generate the content template.

16. The system of claim 13, further comprising a user profile module to create a custom user profile for the user of the virtual reality device.

17. The system of claim 16, wherein, to create a custom user profile, the user profile module is configured to:
gather user data, wherein user data comprises at least one of age, health statistics, and runtime activity statistics;
generate an activity profile, wherein the activity profile comprises the user data relating to historical health and the historical safety of the user for different historical virtual scenarios within the simulation;
generate a stress threshold profile, wherein the stress threshold profile comprises the stress data of the user for the different historical virtual scenarios within the simulation; and
integrate the user data, the activity profile, and the stress threshold profile to create the custom user profile.

18. A computer program product comprising a non-transitory computer readable storage medium having program instructions embodied therewith, the program instructions executable by a processor to cause the processor to perform a method comprising:
collecting, using biometric sensors, stress data associated with a user of a virtual reality device;
determining a stress level of the user based on the stress data, wherein the stress level is a level of strain of the user;
retrieving historical data of the user, wherein the historical data includes activities and scenarios within one or more historical virtual sessions of a simulation during a first time period and surrounding activity and historical user stress levels associated with the activities within the one or more historical virtual sessions, wherein the surrounding activity is within a surrounding environment during a first time period, wherein the surrounding environment comprises a geographic area containing both the user of the virtual reality device and real objects;
monitoring a current environment of the user during a current virtual session, wherein the current environment is the surrounding environment during a second time period, wherein the second time period is subsequent to the first time period;
identifying a safety hazard during the current virtual session based on the stress data and the current environment;
determining, using the historical data, historical virtual scenarios that affect the historical user stress level or historical safety of the user; and
generating, using the determined historical virtual scenarios, a safe virtual scenario to eliminate the safety hazard.

19. The computer program product of claim 18, wherein the method further comprises:
generating a content template for the simulation, wherein the content template comprises mapping an interactive entity within the simulation to the stress level of the user.

20. The computer program product of claim 18, wherein retrieving the historical data comprises:
recording movements and the activities during the historical virtual session using activity logging and code playback sequences;
mapping the recorded movements and activities against the historical user stress levels and the historical safety;
analyzing user behavior for different historical virtual scenarios within the simulation;

identifying the historical user stress levels and the historical safety for the different historical virtual scenarios; and mapping the user behavior for the different historical virtual scenarios against the historical user stress levels and the historical safety.

\* \* \* \* \*